May 6, 1958    W. P. VAN DEN BLINK ET AL    2,833,914
ELECTRICALLY-CONDUCTIVE BODY FOR USE IN BUTT-WELDING
Filed July 22, 1954
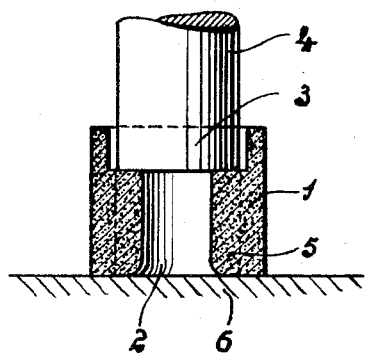
INVENTORS
WILLEM PIETER VAN DEN BLINK
EELKE HERMAN ETTEMA
BY
AGENT United States Patent Office 2,833,914
Patented May 6, 1958

2,833,914

ELECTRICALLY-CONDUCTIVE BODY FOR USE IN BUTT-WELDING

Willem Pieter van den Blink and Eelke Herman Eitema, Utrecht, Netherlands, assignors, by mesne assignments, to North American Philips Company, Inc., New York, N. Y., a corporation of Delaware Application July 22, 1954, Serial No. 445,103

Claims priority, application Netherlands August 18, 1953

1 Claim. (Cl. 219—136)

This invention relates to electrically-conductive slag-forming bodies for use in butt-welding and more particularly to the butt-welding of a pin-shaped metal object such as a bolt to a metallic surface by maintaining an arc flame between the parts to be joined for a predetermined period and subsequently bringing the two parts in contact with one another.

Since the surfaces to be joined are first spaced apart a short distance, there is space available in which the arc can burn, so that metal can fuse at the two surfaces. After a sufficient amount of metal has fused, the parts are brought in contact with one another so that the arc extinguishes and subsequently the fused metal coagulates. In this method use may be made of a slag-forming body which serves to adjust the desired spacing between the two surfaces so that an arc of optimum length is obtained, which body also provides the slag for protecting the fused metal against the action of the atmosphere. It has been suggested to compose the said body of a mixture of substances such as used in coatings of welding rods. In order to ensure coherence of the said substances they are moulded into a body of the desired size, whereafter the slag-forming constituents are sintered by heating the body to a high temperature.

In order to bring about ignition of the arc flame in this method, the body contains powdery metal, as a rule substantially consisting of powdery iron, to an amount which brings about an electric conductivity sufficient for the ignition of the arc flame.

According to the invention, use is made of an electrically conductive slag-forming body which is characterized in that the electric conductivity required for the ignition of the arc flame is brought about wholly or in part by the presence of reduced titanium dioxide.

As is well known, titanium dioxide is a white powder which is not conductive for electric current. However, if oxygen is extracted therefrom, its color changes from white through light-grey to dark violet-grey and this involves the occurrence of conductivity for electric current, which conductivity is greater as the color becomes darker. In most cases a decrease in oxygen content of some percent already brings about a conductivity sufficient to cause a slag-forming body composed of the aforementioned material to ignite the arc flame in the said method.

In one preferred embodiment of the invention, such a body is used in a method of butt-welding in which it also fulfills the function of an element which determines the burning period of the arc flame.

In this method the pin which comprises a slag-forming body at its extremity is pressed against a metallic surface, the composition of the body and also its shape and size being so chosen that, after expiration of the desired burning period of the arc, but not earlier, a portion of the body has been deformed due to the exposure to the high temperature of the arc flame such that the extremity of the pin under the action of a pressure exerted on it moves towards the surface.

It has been found that the burning period of the arc flame and also the amount of metal fused by the arc flame may be adjusted to the desired value in a surprisingly accurate and reproducible manner when use is made of a slag-forming body according to the invention.

This is presumably due to the fact that during burning of the arc reduced titanium dioxide is oxidized by atmospheric oxygen resulting in a decrease in the conductivity of the slag-forming body, so that the welding current is for the greater part transported by the arc flame.

There is reason for the assumption that the arc flame causes the conductivity of a slag-forming body containing much powdery metal to increase in a manner which cannot be controlled, with the result that a portion of the welding current which is not accurately reproducible is extracted from the arc flame and the velocity at which the body or part thereof is heated to the temperature at which it is no longer resistant to a force exerted thereon is not adjustable in an exactly reproducible manner. A suitable method of manufacturing such bodies consists in exposing a body containing titanium dioxide which body has been given the desired shape but has not been sintered to a thermal treatment up to the sintering temperature in a flow of inert gas, for example nitrogen. Titanium dioxide splits off part of the oxygen at the sintering temperature, which action may be assisted by reducing powdery metals frequently used in such bodies to improve the welding metal.

A slagforming body according to the invention commonly comprises not only reducing metal and titanium oxide, but also other substances such as suitable silicates. The amount of titanium oxide usually is from 30% to 80% by weight.

A suitable body according to the invention is obtained, for example, by manufacturing a mixture consisting of:

| | Percent by weight |
|---|---|
| Rutile | 60 |
| Bentonite | 27 |
| Manganese-silicon | 13 | and shaping this mixture, after the addition of water, into a body of the desired shape and size, for example in a mould. Subsequently, the bodies are dried and subsequently heated to 1100° C. in nitrogen gas, the constituents thus being sintered to compactness, gases being expelled and the oxygen content of the titanium oxide being reduced to the desired extent.

In order that the invention may be readily carried into effect, it will now be described with reference to the accompanying drawing, showing, by way of example, a suitable form of a slag-forming body according thereto.

The body as shown in section and indicated by 1 is composed of titanium dioxide, reducing metal and a suitable silicate, its outer wall being cylindrical and exhibiting, at 2, a central cavity in which the welding arc can burn. At 3, there is provided an enlarged opening to support a pin, which is under pressure, until a part 5 of the body 1, bounded by a dotted line, has been fused by the welding arc burning in the cavity 2.

Reference numeral 6 indicates a plate to which the extremity of pin 4 is to be secured.

While we have shown and described the preferred embodiment of our invention, it will be understood that the latter may be embodied otherwise than as herein specifically illustrated or described and that in the illustrated embodiment certain changes in the details of construction and in the arrangement of parts may be made without departing from the underlying idea or principle of the invention within the scope of the appended claim.

What is claimed is:

An electrically conductive slag forming body for use in butt welding two objects comprising said slag forming body positioned therebetween and being at least partly composed of reduced titanium dioxide constituting 60% by weight of the body, bentonite being 27% by weight of the body, and manganese-silicon being 13% by weight of said body, said body having a central cavity in which the welding arc burns, and the electric conductivity of said body necessary for the ignition of the arc flame when the welding current is applied being brought about at least partly by said reduced titanium dioxide in said body.

References Cited in the file of this patent

UNITED STATES PATENTS

| | | |
|---|---|---|
| 1,977,277 | Judy | Oct. 16, 1934 |
| 1,978,316 | Miller | Oct. 23, 1934 |
| 2,127,564 | Kepfer | Aug. 23, 1938 |
| 2,150,625 | Jones et al. | Mar. 14, 1939 |
| 2,256,861 | Boer | Sept. 23, 1944 |
| 2,490,179 | Willigen | Dec. 6, 1949 |
| 2,509,999 | Willigen | May 30, 1950 |
| 2,510,000 | Willigen | May 30, 1950 |
| 2,643,319 | Willigen | June 23, 1953 |